United States Patent
Carter et al.

(10) Patent No.: US 6,799,923 B2
(45) Date of Patent: *Oct. 5, 2004

(54) TRENCHLESS WATER PIPE REPLACEMENT DEVICE AND METHOD

(75) Inventors: Robert Williams Carter, Alameda, CA (US); Robert Ward Carter, Lafayette, LA (US)

(73) Assignee: TRIC Tools, Inc., Alameda, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/222,006

(22) Filed: Aug. 14, 2002

(65) Prior Publication Data

US 2003/0044237 A1 Mar. 6, 2003

Related U.S. Application Data (63) Continuation-in-part of application No. 09/939,084, filed on Aug. 24, 2001, now Pat. No. 6,524,031, which is a continuation of application No. 09/350,948, filed on Jul. 9, 1999, now Pat. No. 6,305,880, which is a continuation of application No. PCT/US98/00266, filed on Jan. 9, 1998.
(60) Provisional application No. 60/312,387, filed on Aug. 14, 2001, and provisional application No. 60/035,174, filed on Jan. 9, 1997.

(51) Int. Cl.[7] .......................... F16L 55/18; F16L 55/44
(52) U.S. Cl. ................................................. 405/184.3
(58) Field of Search ............................. 405/154.1, 156, 405/184, 184.1, 184.3, 155, 154; 175/53

(56) References Cited

U.S. PATENT DOCUMENTS

| | | | | |
|---|---|---|---|---|
| 652,367 A | * | 6/1900 | Law ........................... 166/55.3 |
| 928,361 A | * | 7/1909 | Cockburn ................ 15/104.07 |
| 1,001,205 A | * | 8/1911 | Lovell ....................... 166/55.2 |
| 1,519,882 A | * | 12/1924 | Roderick et al. .......... 166/55.3 |
| 1,618,368 A | * | 2/1927 | Dietle ........................ 166/55.2 |
| 1,638,494 A | * | 8/1927 | Lewis et al. ............. 294/86.15 |
| 1,717,588 A | * | 6/1929 | Small .......................... 29/517 |
| 1,719,449 A | * | 7/1929 | Rauko ......................... 30/168 |
| 2,163,384 A | * | 6/1939 | Stevens .................. 15/104.07 |
| 2,203,158 A | * | 6/1940 | Isidor ........................ 30/92.5 |
| 2,360,425 A | * | 10/1944 | Kinzbach .................. 166/55.3 |
| 2,392,495 A | * | 1/1946 | Nameth ...................... 30/92.5 |
| 2,502,711 A | * | 4/1950 | Evans ........................ 30/92.5 |
| 2,534,858 A | * | 12/1950 | Ellis .......................... 166/55.7 |
| 2,598,930 A | * | 6/1952 | Murphy ....................... 166/72 |
| 2,638,165 A | * | 5/1953 | Barber ....................... 166/55.2 |
| 2,662,276 A | * | 12/1953 | Mirl ............................ 29/255 |
| 2,803,301 A | * | 8/1957 | Warner et al. ............. 166/55.7 |
| 2,834,106 A | * | 5/1958 | Conder ....................... 30/92.5 |
| 2,846,193 A | * | 8/1958 | Chadderdon ............... 166/55.7 |
| 2,947,253 A | * | 8/1960 | Cirilo ......................... 175/4.53 |
| 2,983,042 A | * | 5/1961 | Frantz et al. ................ 30/92.5 |
| 2,999,541 A | * | 9/1961 | Kinzbach et al. .......... 166/55.7 |
| 3,005,493 A | * | 10/1961 | Crowe et al. ................ 166/55 |
| 3,023,040 A | * | 2/1962 | Cawley et al. ............... 403/11 |
| 3,073,389 A | * | 1/1963 | Conner ...................... 166/55.8 |

(List continued on next page.)

*Primary Examiner*—Thomas B. Will
*Assistant Examiner*—Tara L. Mayo
(74) *Attorney, Agent, or Firm*—Robert O. Guillot; Intellectual Property Law Offices (57) ABSTRACT

The trenchless water pipe replacement device includes a cable pulling device, a pipe splitter, a length of cable and a cable end piece. The cable is fished through a pipe that is to be replaced, and a length of replacement pipe is attached to the end piece. The pipe splitter is disposed at the front end of the pipe and the cable pulling device is disposed behind the pipe splitter. When the cable pulling device is activated, the end piece makes contact with the rear end of the pipe and sufficient pulling force is applied to the cable to dislodge the pipe and pull it onto the pipe splitter, which splits the pipe as it is pulled from the ground. The replacement pipe is pulled behind the end piece, such that when the end piece is entirely pulled through the ground, the replacement pipe is disposed in its place.

11 Claims, 9 Drawing Sheets

U.S. PATENT DOCUMENTS

| | | | | |
|---|---|---|---|---|
| 3,114,416 A | * | 12/1963 | Kammerer | 166/55.7 |
| 3,181,302 A | * | 5/1965 | Lindsay | 405/156 |
| 3,341,930 A | * | 9/1967 | Celestin | 29/890.031 |
| 3,543,377 A | * | 12/1970 | Muir | 29/234 |
| 4,003,122 A | * | 1/1977 | Overmyer et al. | 29/429 |
| 4,100,980 A | * | 7/1978 | Jenne | 175/19 |
| 4,118,940 A | * | 10/1978 | Beane | 405/174 |
| 4,505,302 A | * | 3/1985 | Streatfield et al. | 138/97 |
| 4,693,404 A | * | 9/1987 | Wayman et al. | 225/103 |
| 4,720,211 A | * | 1/1988 | Streatfield et al. | 405/184.3 |
| 4,738,565 A | * | 4/1988 | Streatfield et al. | 405/184.3 |
| 4,928,866 A | * | 5/1990 | Carruthers | 225/106 |
| 5,997,215 A | * | 12/1999 | Schwert | 405/184 |

* cited by examiner

TRENCHLESS WATER PIPE REPLACEMENT DEVICE AND METHOD

CROSS REFERENCE TO RELATED APPLICATIONS

This application is a continuation-in-part of patent application Ser. No. 09/939,084, filed Aug. 24, 2001 now U.S. Pat. No. 6,524,031, which is a continuation of U.S. Ser. No. 09/350,948 filed Jul. 9, 1999 now, issued U.S. Pat. No. 6,305,880, issued Oct. 23, 2001, entitled: Device and Method for Underground Replacement of Pipe, which is a continuation to PCT Application No. PCT/US98/00266, filed Jan. 9, 1998, which claims priority to U.S. Provisional Patent Application No. 60/035,174, filed Jan. 9, 1997; and this application also claims priority to U.S. Provisional Patent Application Ser. No. 60/312,387 filed Aug. 14, 2001, entitled: Trenchless Water Pipe Replacement Device and Method.

BACKGROUND OF THE INVENTION

1. Field of the Invention

The present invention relates generally to devices, systems, and methods for the trenchless replacement of pipes, and particularly to such devices that are used to remove and replace water service pipes.

2. Description of the Prior Art

Water is typically supplied to buildings, whether commercial or residential, through water pipes that are buried in the ground. These water pipes are typically galvanized steel pipes, although copper, plastic and other pipe materials are sometimes utilized, and such water pipes typically have a diameter from approximately ½ inch to approximately 3 inches. For various reasons, such as corrosion or puncture, it can become necessary to replace the existing pipe with a new water pipe. Typically, this replacement process involves the digging of a trench in the ground along the path of the existing pipe to expose it, remove it and install a replacement pipe. Such trenches can be expensive and disruptive of landscaping and perhaps structures that have been placed over the existing pipe, and are therefore in the way of the trench which must be dug for pipe replacement.

The present invention is a device and method for the trenchless replacement of the existing pipe. A variety of trenchless pipe replacement devices and methods are known to exist. These devices and methods are designed for the replacement of sewer mains and laterals, and typically involve the fishing of a cable through the existing pipe followed by the attachment of a pipe bursting mole to the end of the cable, along with the attachment of the replacement pipe to the mole. Thereafter, utilizing a cable pulling device, the mole is pulled through the existing pipe, bursting it and pushing the pipe fragments outward, and the mole and replacement pipe are pulled through the existing pipe from one end to the other. At the completion of the pipe replacement process, the old pipe has been fragmented, such that the fragments remain in the ground, and the new replacement pipe has been pulled through the location of the existing, fragmented old pipe. Such prior art pipe replacement systems work well for larger diameter pipes, and pipes that fragment; however, they are not well adapted for the replacement of narrow diameter pipes, such as water pipes. As is discussed below, the present invention works by removing the existing pipe and replacing it with the replacement pipe.

SUMMARY OF THE INVENTION

The trenchless water pipe replacement device and method of the present invention includes a cable pulling device, a length of cable, a pipe splitting device and a cable end piece. The ends of the existing pipe are exposed, and the cable is fished through the pipe from a front end to a rear end. A cable end piece, that includes a relatively flat pipe end engagement surface, is then engaged to the end of the cable proximate the rear end of the pipe to be replaced. A suitable length of replacement pipe is then engaged to the cable end piece. At the front end of the cable a cable pulling device is engaged to the cable and a cable pulling device frame is engaged with the ground at the front end of the pipe. The cable pulling device can then be activated to pull the cable through the existing pipe, such that the pipe contacting surface of the cable end piece makes contact with the rear end of the pipe. Further pulling of the cable by the cable pulling device creates sufficient tension and pulling force on the rear end of the pipe that the pipe becomes dislodged from its location within the ground. Further pulling of the cable by the cable pulling device results in the existing pipe being pulled through the ground by the force of the cable end piece upon the rear end of the pipe, and the replacement pipe is pulled into the cavity due to its attachment with the cable end piece.

In a preferred embodiment, a pipe splitter is engaged at the front end of the pipe to split the pipe as it emerges. The pipe splitting device includes a tapered nose portion having a nose tip that is inserted into the front end of the pipe prior to the activation of the cable pulling device. The nose portion of the pipe splitter preferable includes a cable groove which guides the cable towards the cable pulling device, and a sharpened edge which serves as a splitting force focal point for splitting the pipe as it is pulled. In the preferred embodiment, the tapered nose is formed with a taper angle of from 1° to 15°, and preferably approximately 2°. To place the cable pulling device out of a direct line of the emerging pipe, the pipe splitting device is preferable formed with an elbow having an angle of from 20° to 90°, and preferably approximately 30° to 35°.

It is an advantage of the present invention that a device for the trenchless replacement of water pipes has been developed.

It is another advantage of the present invention that a trenchless water pipe replacement device has been developed in which the existing pipe is removed from the ground and a replacement pipe is inserted at the location of the removed pipe.

It is a further advantage of the present invention that a pipe splitting device is utilized to split the existing pipe as it is removed from the ground in order to facilitate its removal.

These and other objects and advantages of the present invention will no doubt become apparent to those skilled in the art upon reading the following detailed description which makes reference to the several figures of the drawing.

DESCRIPTION OF THE PREFERRED EMBODIMENTS

Figure 1:
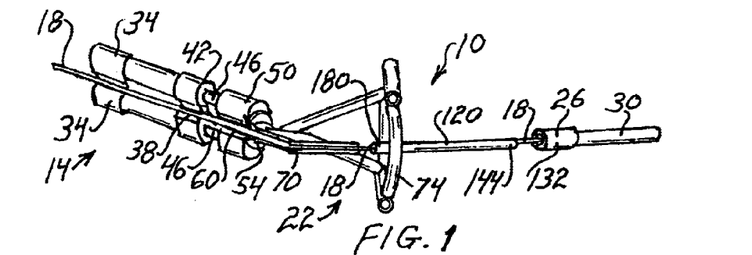
FIGS. 1–3 are perspective views depicting the trenchless water pipe replacement system of the present invention.
Figure 2:
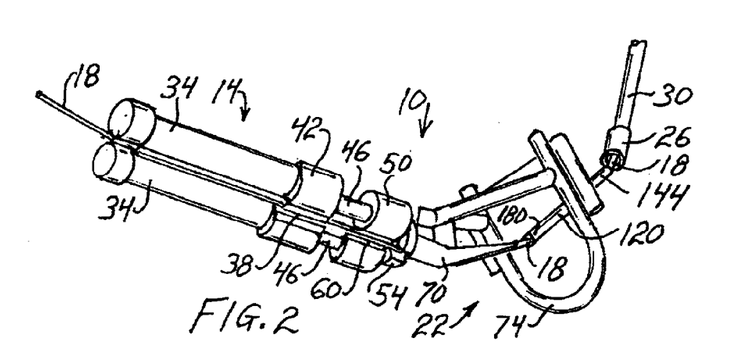
Figure 3:
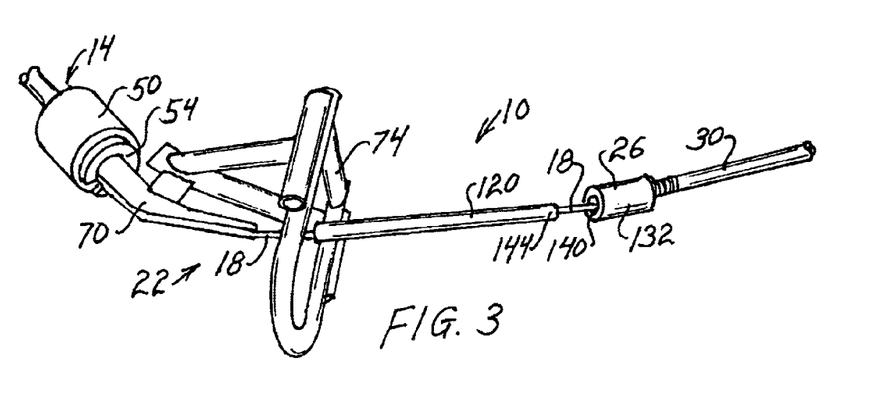

As depicted in FIGS. 1, 2 and 3, the components of the system 10 include a cable pulling device 14, a length of cable 18, a pipe splitting device 22, a cable end piece 26 and a length of replacement pipe 30. The cable pulling device 14 may take many forms, however a preferred cable pulling device is a post tensioning ram (PTR) 14, as seen in FIGS. 1–3. The PTR includes two hydraulic cylinders 34 and a pair of cable gripping collets 38 that are engaged in a hydraulic cylinder base piece 42. A piston rod 46 projects from each hydraulic cylinder 34 and the front end of each piston rod is engaged within a front end piece 50 of the PTR. A nose piece 54 may project from the front end piece 50 of the PTR. A length of cable 18 is engaged in the PTR 14 such that the cable passes through the front end piece 50 and within the pair of cable gripping collets 38. As is known to those skilled in the art, the PTR is operated in a cyclic mariner in which hydraulic pressure causes the piston rods 46 to extend, such that the hydraulic cylinder base piece 42 is separated from the front end piece 50. The cable 18 is gripped in the pair of collets 38 and pulled rearwardly, relative to the front end piece 50 when the piston rods extend. The PTR operates in a series of repeating pulling strokes, in which the cable is gripped by the pair of collets 38 on each pulling stroke and the collets 38 release from the cable when the PTR piston rods are retracted into the hydraulic cylinders on a recovery stroke to enable the PTR to commence a further pulling stroke. A preferred alternative cable pulling device may have a second pair of collets 60, which may be located in the front end piece 50, such that pulling tension on the cable at the end of a pulling stroke is not released when the first pair of collets 38 release their grip upon the cable during a recovery portion of the cyclic pulling process of the PTR. Such PTR devices are described in copending U.S. patent application Ser. No. 09/939,084 filed Aug. 24, 2001, the disclosure of which is incorporated herein as though set forth in full.

A third component of the present invention is the pipe splitting device 22, and a detailed depiction of it is presented in FIGS. 4, 5, 6 and 7. As depicted therein, the pipe splitting device 22 generally includes a pipe splitter 70 and a splitter support frame 74. The frame 74 may take various shapes and sizes. The particular frame depicted in FIGS. 4–7 includes a U-shaped base member 78 having a central base support piece 82 engaged between the legs 84 of the U-shaped base member. Two frame members 86 project in a V-shape from the legs 84 of the base member 78, and a flat plate piece 90 is engaged to the frame members 86 at the apex of the V for engagement of the pipe splitter 70 thereto, such as by welding the splitter 70 to the plate 90. Two outer tubular frame members 92 may be provided to slip the frame over anchoring rods 93 driven into the ground to anchor the frame for a pipe replacement operation. In using such anchoring rods the frame can be operationally installed on the ground surface while the cable leads into a hole for access to a pipe disposed in the ground. As is described in detail hereinbelow, the system 10 is generally power enough to dislodge the old pipe from its in-ground channel and pull it up to the splitter 70.

Figure 24:
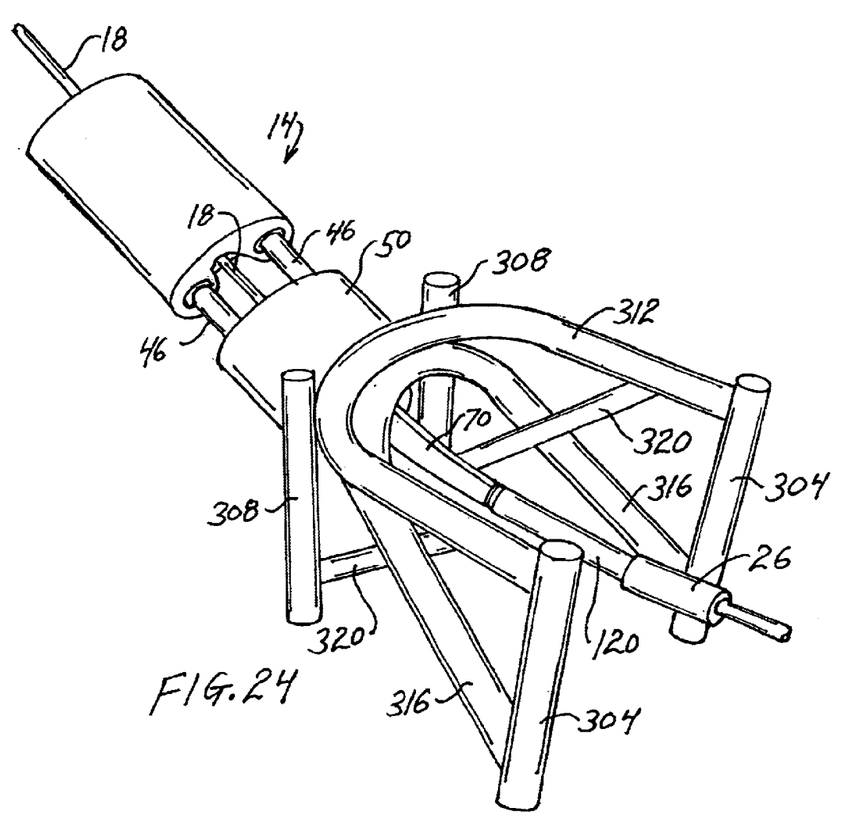
FIG. 24 is a perspective view of an alternative splitter support frame.

An alternative frame embodiment 300 is depicted in FIG. 24. As depicted therein, the frame 300 includes two forward legs 304 and two rearward legs 308 that are joined together at their upper ends by a U-shaped frame member 312. A diagonal bracing member 316, which may also be U-shaped, is engaged between the lower ends of the forward legs 304 and the upper ends of the rearward legs 308. Further diagonal braces 320 are engaged between the lower ends of the rearward legs 308 and the forward end of the U-shaped frame member 312. The pipe splitter 70 is engaged with the top end of the U-shaped frame member 312, such that the cable puller 14 is engagable with the rearward end of the pipe splitter 70, as has been described hereabove. Generally, the frame 300 has a stronger structural integrity than the frame 74.

The pipe splitter 70 includes a tapered splitting nose 94 that is formed with a tapered pipe engaging tip 98 having an angle in the range of from approximately 10 to approximately 15° from the centerline of the pulling cable, with a preferred angle in the range of approximately 1.5 to approximately 100, and preferably approximately 2°, as is described in more detail herebelow. The pipe splitter 70 is formed with a generally centrally located elbow 104 having an angle 106 of from approximately 20° to as much as approximately 90°, with a preferred angle 106 in the range of approximately 30 to 35°. The upper end 110 of the pipe splitter 70 is engaged with the nose piece 54 of the PTR. While the upper end 110 of the splitter 70 is shown in FIGS. 4–7 to be welded to the PTR nose piece 54, it may also be made to be releasably engagable with the PTR nose piece, such as by using an enlarged cylindrical member, or annulus, having a recess that the PTR nose piece fits within. Such an annulus is taught in U.S. patent application Ser. No. 09/350,948, incorporated herein.

Figure 4:
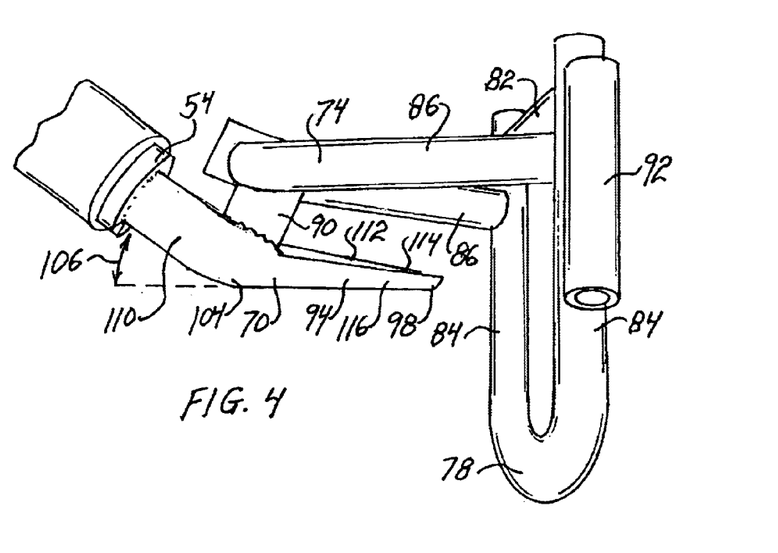
FIGS. 4–7 are perspective views depicting the pipe splitting device of the present 10 invention.
Figure 5:
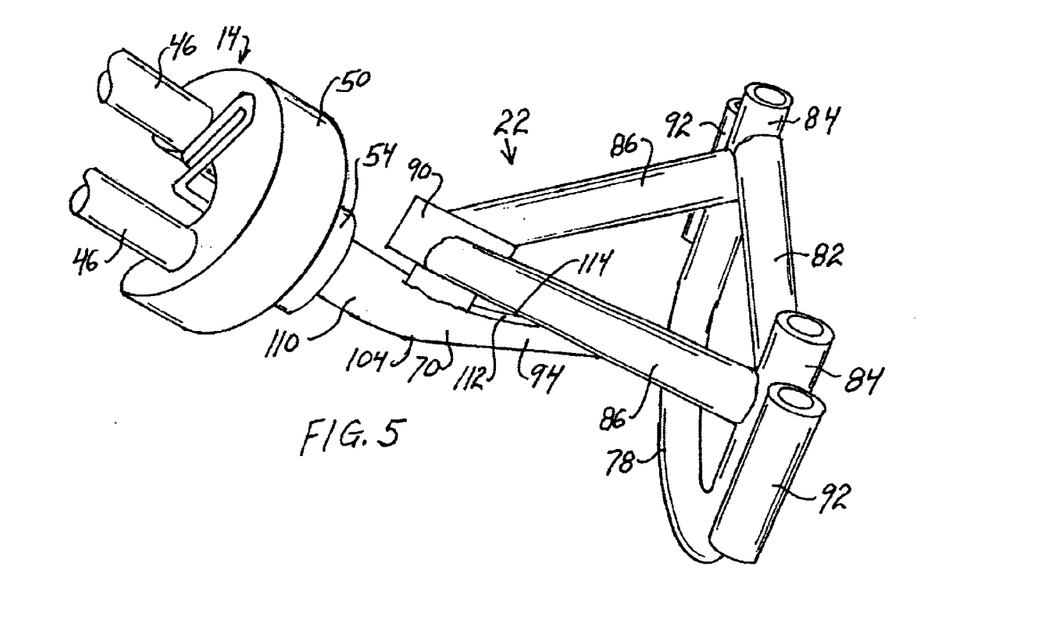
Figures 6, 7:
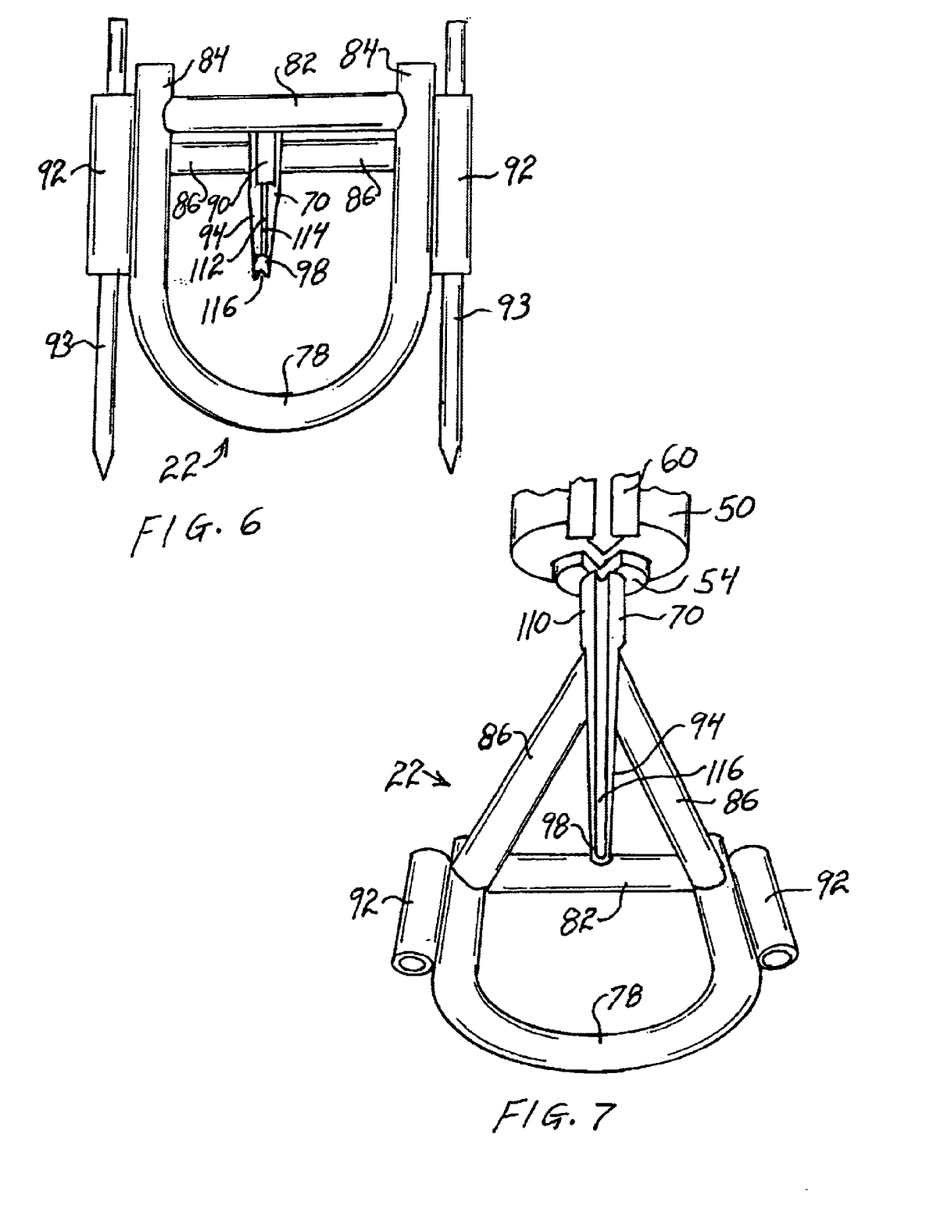

As is best seen in FIGS. 4 and 5, a pipe splitting blade 112 having a sharpened edge 114 projects outwardly from the surface of the splitter 70 along the inner surface of the elbow 104 of the splitter. A cable groove 116 is cut into the splitter 70 along the outer surface of the elbow 104, forming a shallow groove proximate the pipe engaging tip 98 of the splitter and a deeper groove in the upper end 110 of the splitter 70, such that the cable 18 is guided into the nose piece 54 of the PTR and thence into the cable gripping collets 38 and 60 (if present), as described hereabove.

Returning to FIGS. 1–3, it can now be understood that the cable passes through the cable pulling device 14, and through the pipe splitter 70, and is passed through a length of pipe 120 (which may be dozens or hundreds of feet long (although it is depicted in FIGS. 1–3 as approximately three feet for the purpose of this disclosure), and the cable end passes out of the pipe 120 and is engaged with the cable end piece 26.

Figure 8:
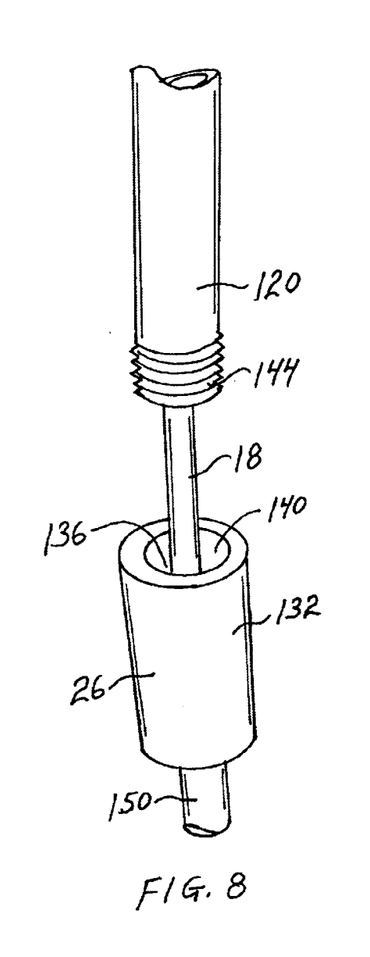
FIGS. 8–10 are perspective views depicting the cable end components of the present invention.
Figures 9, 10:
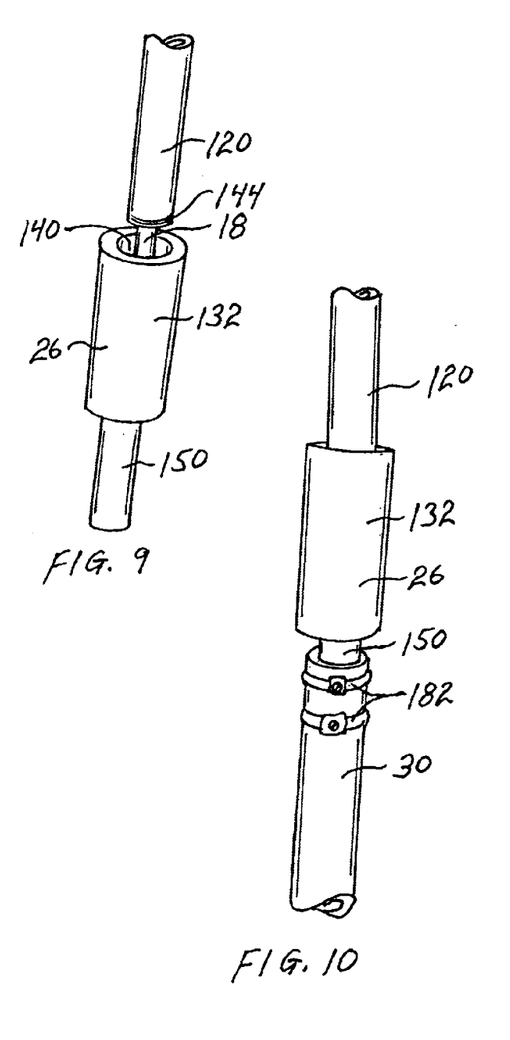

As depicted in FIGS. 8–10, the cable end piece 26 includes a cylindrical member 132 having a cable passage bore 136 formed therethrough. The bore is enlarged 140 at the front end to a diameter than is larger than the pipe diameter, such that the end 144 of the pipe 120 will project into the enlarged bore 140, as is best seen in FIG. 10. A cylindrical cable end termination piece 150 is suaged onto the distal end of the cable, where the end piece 150 has a diameter that is larger than the diameter of the cable passage bore 136 of the cylindrical piece 132, such that the distal end of the cable cannot be pulled through the bore 136 in the cylindrical piece 132. It is therefore to be understood that when the cable 18 is pulled by the PTR 14, that the cylindrical end piece 132 will apply a pushing force to the end 144 of the pipe 120, to push the pipe 120 towards the pipe splitting nose 94 disposed at the other end of the pipe.

As depicted in FIG. 10, a length of replacement pipe 30 is to be engaged to the suaged cable end termination piece 150 in any of various engagement systems. Where the replacement pipe is threaded at its end, a threaded engagement with the end piece 150 is made. Other pipe engagement methods, such at those described in U.S. patent Ser. No. 09/350,948, incorporated herein, may be utilized when suitable, such that the replacement pipe 30 may be pulled behind the old pipe 120 when the old pipe is removed, as is next described.

The trenchless water pipe replacement system of the present invention is utilized to replace an old, typically defective, length of pipe 120 that is buried in the ground. In assembling the system 10 both ends of the pipe to be replaced are exposed and the cable 18 is fished through the pipe 120 from a back end 144 to a front end 180 of the pipe. The replacement pipe 30 is engaged to the cable end termination piece 150. A variety of replacement pipe engagement methods can be devised, and simple band clamps 182 by way of example are shown in FIG. 10 to further assure that the replacement pipe will not separate from the end piece 150. The front end of the cable protrudes from the front end 180 of the pipe 120 and is passed through the pipe splitter 70, and then routed through the cable pulling device 14.

After the system is assembled, the cable pulling device 14 is activated to commence pulling the cable 18. As the cable is pulled, the cable end piece 132 makes contact with the back end 144 of the pipe 120, such that the back end 144 of the pipe becomes disposed within the enlarged bore 140 of the end piece 132. As the cable is further pulled by the cable pulling device, the front end 180 of the pipe and the splitting nose 94 of the pipe splitter 70 are drawn together, such that the tapered tip 98 of the splitter becomes inserted into the front end 180 of the pipe. As the cable is further pulled the pipe splitter tip 98 will commence to split the front end 180 of the pipe (see FIGS. 14–16 described below), and the splitter frame 74 will become pressed against the side wall of the hole from which the front end 180 of the pipe protrudes. As the cable is further pulled by the cable pulling device, sufficient force will be applied to the pipe to dislodge the pipe within its buried location, causing the front end 180 of the pipe to move forward against the tip 98 of the pipe splitter 70. The cable pulling device is then continuously activated in its cyclic process, such that the old pipe 120 is withdrawn from its location in the ground as the cable end piece 132 is pulled towards the pipe splitting nose 94 at the front end of the pipe.

Figure 11:
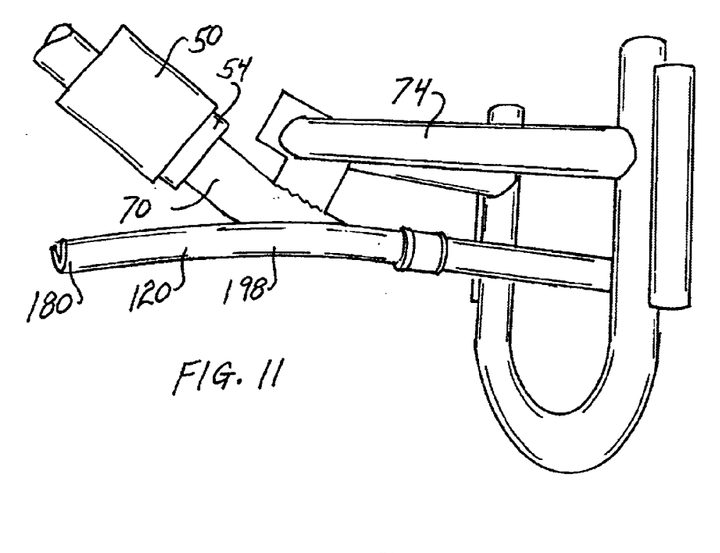
FIGS. 11–13 are perspective views depicting a pipe splitting operation utilizing the present invention.
Figure 12:
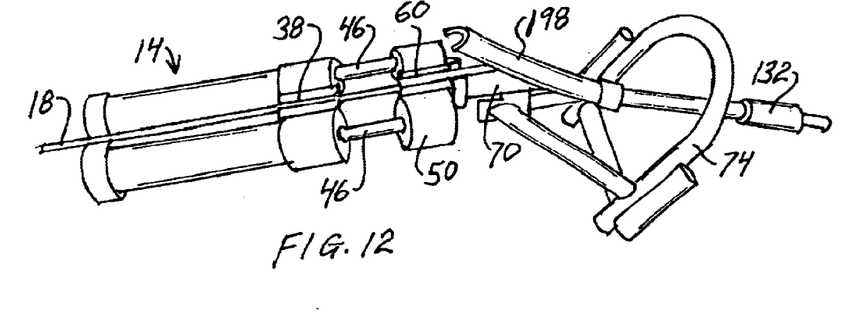
Figure 13:
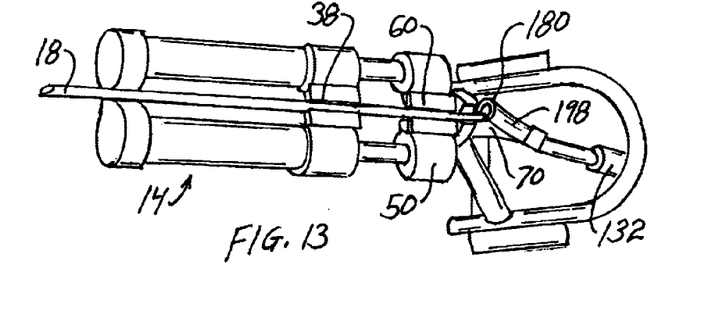

As indicated above, the cable splitter 70 is formed with an elbow 104 having an angle of approximately 30–35° away from the pipe centerline, and the pipe splitting blade 112 is located in the inner surface of the elbow 104. Thus, as depicted in FIGS. 11–13, when pipe is pulled and split, the split, but attached, pipe segment 198 continues in a relatively straight path, while the cable and cable pulling device 14 are angled upwardly at the approximately 30–35° angle of the splitter 70, whereby the cable pulling device 14 is placed out of the direction of the split pipe end 198. This enables the operator to gain easy access to the split pipe and to cut it at suitable lengths, such that further old pipe can be pulled into the pipe access hole. As the cable end piece 132 is drawn behind the old pipe 120 through the ground in the channel that was previously occupied by the old pipe, the replacement pipe 30 that is attached to the cable end termination piece 150 is simultaneously pulled through the channel. When the old pipe has been completely pulled through the ground, and split by the pipe splitter 70, the cable end piece 132 will emerge from the pipe channel, and the replacement pipe 30 will have thus been pulled entirely through the channel, such that the old pipe has now been completely replaced by the replacement pipe.

Figure 14:
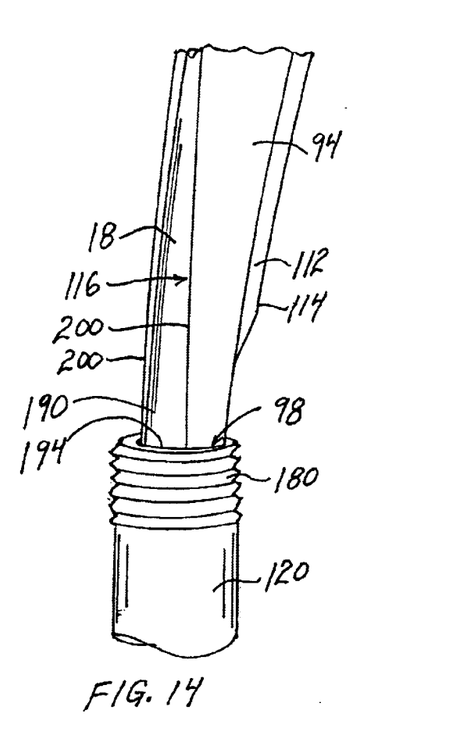
FIGS. 14–16 are perspective views depicting the pipe splitter tip as engaged in a pipe splitting operation.
Figure 15:
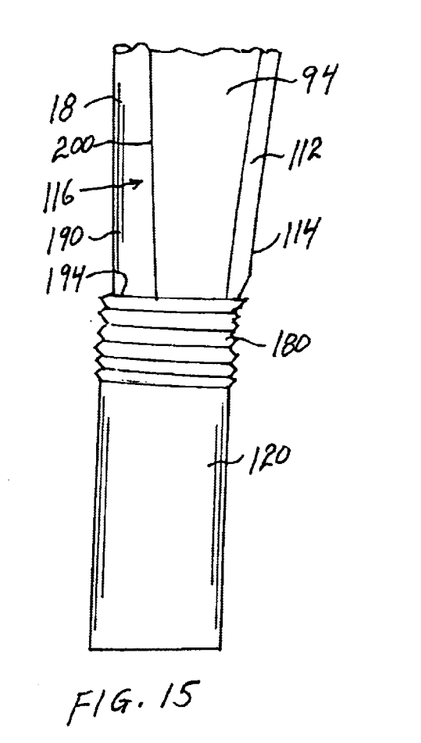
Figure 16:
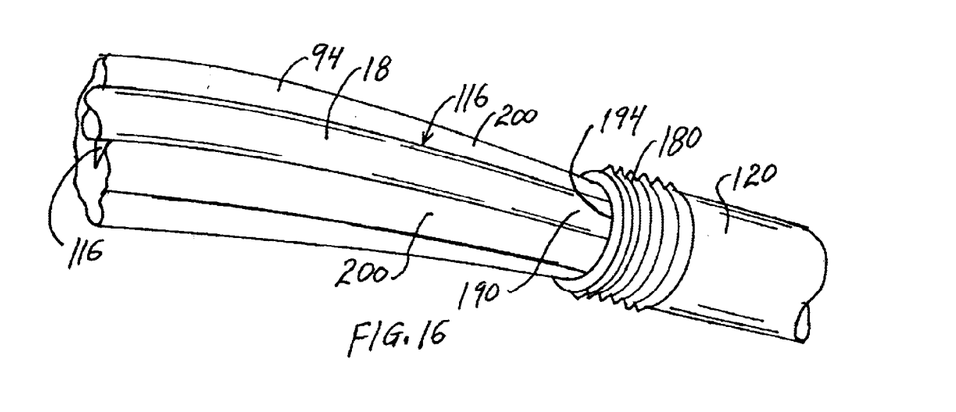

A preferred embodiment of the pipe splitting nose piece 94 and tip 98 is depicted in FIGS. 14–16. As depicted in FIGS. 14–16 the preferred pipe splitting nose piece 94 includes a tapered nose tip portion 98 that is formed with a pipe splitting blade 112 on one side and a cable groove 116 on the opposite side. A preferred taper angle of the nose piece is from approximately 10 to approximately 150 from the centerline of the pulling cable. As will be understood by those skilled in the art, as the taper angle is decreased, the radial splitting force that is applied to the pipe walls increases. That is, for a one pound cable pulling force along the pipe central axis, a 15° taper would exert a radial force of approximately two pounds, a 100 taper would exert a radial force of approximately 2.7 pounds, a 5° taper would exert a radial force of approximately 5.7 pounds, a 2° taper will exert a force of approximately 14 pounds and a 1° taper will exert a radial force of approximately 28 pounds. Given the dimensional and material constraints, the preferred embodiment of the present invention is formed with a taper of from approximately 1.0 to approximately 15° with a preferred taper of from approximately 1.50 to approximately 100 and a more preferred taper of approximately 2° from the centerline of the pulling cable.

As is depicted in FIGS. 14–16, the cable groove 116 is preferably formed such that the cable 18 nests within the groove yet protrudes above the sides 200 of the groove proximate the nose 94 and tip 98 of the splitter. For a ⅜ inch diameter cable (0.375 inches), a preferred groove has a width of approximately 0.4 inches and a depth of approximately 0.3 inches at the tip 98, such that approximately 0.075 inches of the cable protrudes out of the groove at the nose 94 and tip 98. The reason for the protrusion is that, as depicted in FIGS. 14 and 15, the protruding cable surface 190 presses against, and is frictionally engaged with the inner surface 194 of the old pipe 120. As the cable is pulled by the cable pulling device, the frictional engagement of the outer surface 190 of the cable with the inner surface 194 of the old pipe helps to draw the old pipe upon the tapered cable splitting nose piece 94, such that the pipe is split by the blade 112 on the opposite side of the nose piece 94 from the cable 18. Thus the entire force that acts to move the old pipe towards the splitter 70 is not only generated by the cable end piece 132 pushing the back end of the pipe. It is believed that approximately 50% of the force that moves the old pipe 120 towards the splitter can be generated by the frictional engagement of the pipe inner side wall 194 with the cable surface 190 at the nose piece, as the cable is pulled by the cable pulling device.

Figure 17:
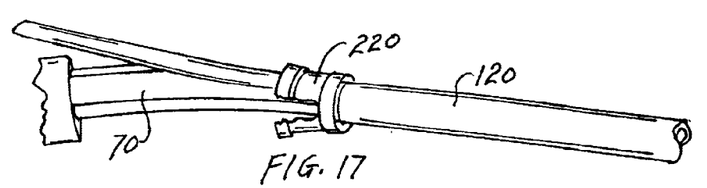
FIGS. 17 and 18 are perspective views depicting the splitting of pipe components by the pipe splitter of the present invention.
Figure 18:
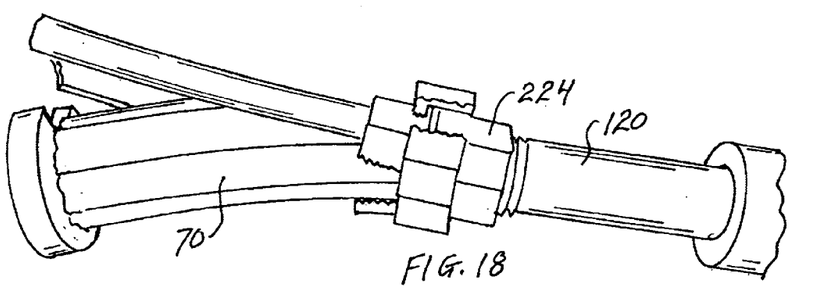
Figure 19:
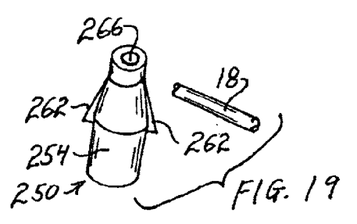
FIGS. 19–23 are perspective views depicting a pipe rear end splitting device of the present invention.
Figure 20:
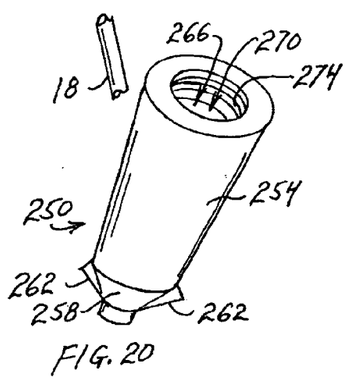
Figure 21:
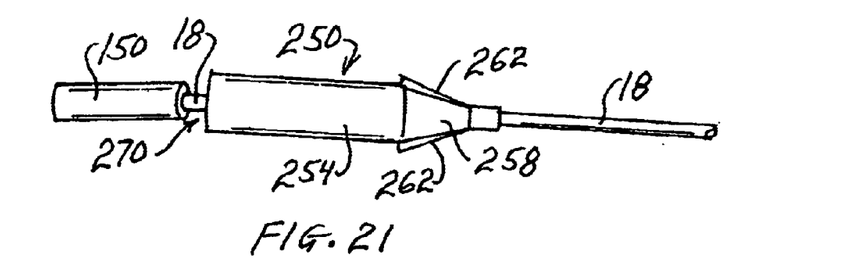
Figure 22:
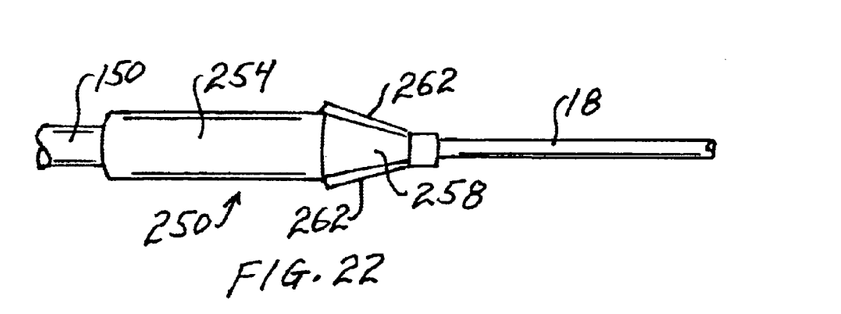
Figure 23:
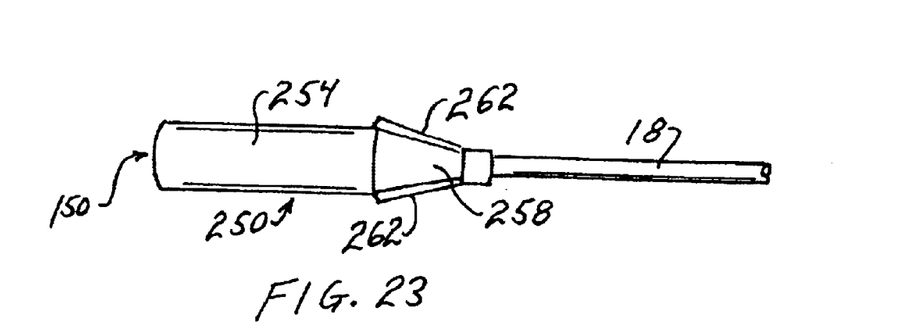

The system 10 is generally powerful enough to split all manner of couplings and unions that may be found in the old pipe system. By way of example, FIG. 17 depicts the splitting of a coupling 220 by the splitter 70, and FIG. 18 depicts the splitting of a union 224 by the splitter 70. A pipe rear end splitting device is depicted in FIGS. 19–23, wherein FIG. 19 is a front perspective view, FIG. 20 is a rear perspective view, and FIGS. 21–23 are side elevational views depicting the rear pipe splitter engaged upon the end of a cable. As depicted in FIGS. 19–23, the pipe end splitter 250 includes a generally cylindrical body portion 254 and a tapered nose portion 258 having a plurality (3 being shown) of pipe engagement and splitting blades 262 formed at the tapered end. A cable passage bore 266 is formed along the central axis of the splitter 250 for the passage of a pulling cable 18 therethrough. As is best seen in FIG. 20, an enlarged bore 270 is axially formed in the rearward end of the splitter 250 coaxially with the cable passage bore 266, and the bore 270 may be internally threaded 274 for the engagement of a threaded end of a replacement pipe therewith. As described hereabove, a cylindrical cable end termination piece 150 is engaged to the distal end of the cable 18, and the end piece 150 has a diameter that is larger than the diameter of the cable passage bore 266 of the splitter 250, such that the distal end of the cable cannot be pulled through the bore 266 of the splitter 250. Additionally, as is best seen in FIGS. 21, 22 and 23, the enlarged bore 270 in the rearward end of the splitter 250 preferably has a diameter that is greater than the diameter of the end piece 150, such that the end piece is pulled into the splitter 250 during a pipe replacement operation. Additionally, the length of the cylindrical body portion 254 of the splitter 250 is preferably long enough (or the diameter of the bore 270 is wide enough) that when the end piece 250 is drawn into the enlarged bore 270, that the threads 274 remain accessible for the threaded engagement of a replacement pipe section therewith.

As the cable 18 is pulled, the pipe splitting blades 262 make contact with the rearward end of the pipe, and a pipe splitter 70, as described hereabove, likewise makes contact with the frontward end of the pipe. As the cable puller is further activated to pull the cable 18, the pipe is then split from both ends. That is, the pipe splitter 70 splits the front end of the pipe as the pipe is drawn towards it, and simultaneously, the rear end splitting device 250 both applies a pushing force to the pipe and splits the pipe at the rear end. To most effectively split the pipe at its rear end, the pipe splitting blades 262 are preferably formed with an angle of between 10 and 20° relative to the longitudinal central axis of the pipe splitter 250. A preferred splitting blade angle is from approximately 1.5° to approximately 150, and a more preferred splitting blade angle is from approximately 2° to approximately 5°, such that significant outward force is applied to the pipe by the edges of the splitting blades 262 to split the pipe.

While the present invention has been shown and described with regard to certain preferred embodiments, it is to be understood that the following claims are intended to cover all alterations and modifications thereto that nevertheless include the true spirit and scope of the present invention.

We claim:

1. A trenchless water pipe replacement device comprising a cable pulling device, a length of cable, a pipe splitter and a cable end piece;
   wherein said pipe splitter includes:
      a means for engaging and splitting a front end of a pipe to be replaced;
      a means for guiding said cable through said pipe splitter and towards said cable pulling device; and
   wherein said cable end piece includes:
      a means for engaging said cable;
      a means for engaging an end portion of a length of replacement pipe; and
      a replacement pipe engagement surface for making contact with a rear end of said pipe to be replaced.

2. A device as described in claim 1 including:
   a cable pulling device frame including;
      a means for engaging said pipe splitter;
      a means for engaging a ground surface proximate said front end of said pipe to be replaced.

3. A device as described in claim 2 wherein said pipe splitter includes a tapered nose portion.

4. A device as described in claim 3 wherein said cable pulling device is engagable with said pipe splitter.

5. A device as described in claim 1 wherein said pipe splitter device includes a tapered nose portion that includes a tip end that is insertable within said front end of said pipe to be replaced.

6. A device as described in claim 5 wherein said means for guiding said cable includes a cable groove that is disposed within said tapered nose portion, said groove being formed to hold said cable therewithin.

7. A device as described in claim 6 wherein said pipe splitter includes a pipe splitting edge that is formed in said nose portion opposite to said groove.

8. A device as described in claim 5 wherein said pipe splitter is formed with a centrally located elbow portion that includes an elbow angle of from 20° to 90°.

9. A device as described in claim 8 wherein said elbow angle is approximately 30° to 35°.

10. A device as described in claim 5 wherein said tapered nose portion is formed with a taper angle of from 1° to 15°.

11. A device as described in claim 10 wherein said taper angle is approximately 2°.

* * * * *

(12) EX PARTE REEXAMINATION CERTIFICATE (9982nd)
United States Patent
Carter et al.

(10) Number: US 6,799,923 C1
(45) Certificate Issued: *Dec. 12, 2013

(54) TRENCHLESS WATER PIPE REPLACEMENT DEVICE AND METHOD

(75) Inventors: Robert Williams Carter, Alameda, CA (US); Robert Ward Carter, Lafayette, LA (US)

(73) Assignee: TRIC Tools, Inc., Alameda, CA (US)

Reexamination Request:
No. 90/012,583, Sep. 14, 2012

Reexamination Certificate for:
Patent No.: 6,799,923
Issued: Oct. 5, 2004
Appl. No.: 10/222,006
Filed: Aug. 14, 2002

( * ) Notice: This patent is subject to a terminal disclaimer.

Related U.S. Application Data

(63) Continuation-in-part of application No. 09/939,084, filed on Aug. 24, 2001, now Pat. No. 6,524,031, which is a continuation of application No. 09/350,948, filed on Jul. 9, 1999, now Pat. No. 6,305,880, which is a continuation of application No. PCT/US98/00266, filed on Jan. 9, 1998.

(60) Provisional application No. 60/312,387, filed on Aug. 14, 2001, provisional application No. 60/035,174, filed on Jan. 9, 1997.

(51) Int. Cl.
*F16L 55/18* (2006.01)
*F16L 55/44* (2006.01)

(52) U.S. Cl.
USPC .................................................... 405/184.3

(58) Field of Classification Search
USPC ...................................................... 405/184.3
See application file for complete search history.

(56) References Cited

To view the complete listing of prior art documents cited during the proceeding for Reexamination Control Number 90/012,583, please refer to the USPTO's public Patent Application Information Retrieval (PAIR) system under the Display References tab.

*Primary Examiner* — Jimmy G. Foster (57) ABSTRACT

The trenchless water pipe replacement device includes a cable pulling device, a pipe splitter, a length of cable and a cable end piece. The cable is fished through a pipe that is to be replaced, and a length of replacement pipe is attached to the end piece. The pipe splitter is disposed at the front end of the pipe and the cable pulling device is disposed behind the pipe splitter. When the cable pulling device is activated, the end piece makes contact with the rear end of the pipe and sufficient pulling force is applied to the cable to dislodge the pipe and pull it onto the pipe splitter, which splits the pipe as it is pulled from the ground. The replacement pipe is pulled behind the end piece, such that when the end piece is entirely pulled through the ground, the replacement pipe is disposed in its place.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 6-9 is confirmed.

Claims 1-5, 10 and 11 are cancelled.

\* \* \* \* \*